US012802263B2

(12) United States Patent
Michalsky et al.

(10) Patent No.: US 12,802,263 B2
(45) Date of Patent: Nov. 17, 2026

(54) DEVICE AND METHOD FOR NON-CONTACT OPTICAL IMAGING OF A SELECTED SURFACE AREA OF A HAND

(71) Applicant: DERMALOG JENETRIC GmbH, Jena (DE)

(72) Inventors: Tom Michalsky, Leipzig (DE); Philipp Riehl, Jena (DE); Daniel Krenzer, Wutha-Farnroda (DE); Undine Richter, Jena (DE); Jörg Reinhold, Jena (DE)

(73) Assignee: Dermalog Jenetric GmbH, Jena (DE)

( * ) Notice: Subject to any disclaimer, the term of this patent is extended or adjusted under 35 U.S.C. 154(b) by 164 days.

(21) Appl. No.: 18/797,018

(22) Filed: Aug. 7, 2024

(65) Prior Publication Data

US 2024/0394913 A1 Nov. 28, 2024

Related U.S. Application Data

(63) Continuation of application No. 17/535,149, filed on Nov. 24, 2021, now Pat. No. 12,080,022.

(30) Foreign Application Priority Data

Nov. 27, 2020 (DE) ..................... 10 2020 131 513.9

(51) Int. Cl.
*G06T 7/73* (2017.01)
*G06F 21/32* (2013.01)
*G06T 7/80* (2017.01)

(52) U.S. Cl.
CPC .................. *G06T 7/73* (2017.01); *G06T 7/80* (2017.01); *G06F 21/32* (2013.01)

(58) Field of Classification Search
None
See application file for complete search history.

(56) References Cited

U.S. PATENT DOCUMENTS 9,025,067 B2 * 5/2015 Gray ..................... G02F 1/0136 348/335
12,080,022 B2 * 9/2024 Michalsky ............. G01B 11/25
2004/0120553 A1 6/2004 Stobbe
2008/0107309 A1 5/2008 Cerni
(Continued)

FOREIGN PATENT DOCUMENTS

CN 217426154 U 9/2022
WO WO 2007/050776 A2 5/2007

*Primary Examiner* — Rodney E Fuller
(74) *Attorney, Agent, or Firm* — Christensen, Fonder, Dardi & Busse PLLC; John P Fonder

(57) ABSTRACT

A device for non-contact optical imaging of a selected surface area of a user's hand, including: a housing in which an image capture unit containing a main camera with an optical axis and an illumination unit is located; a controller; an output unit; a frame arranged outside the housing and connected to the housing via a stand, the frame having edges delimiting a recess which is open on one side, is open frontally with respect to a user position and in which the surface area is positioned by the user, assuming an actual position, the frame having arranged therein an object plane of the main camera with a depth of field region in which a target position for the surface area is located; and a universal active localizing device for determining the actual position in the axial and in the radial direction of the optical axis.

5 Claims, 5 Drawing Sheets

(56) References Cited

U.S. PATENT DOCUMENTS

| | | | | |
|---|---|---|---|---|
| 2009/0245585 | A1* | 10/2009 | Manabe | G06V 40/107 382/107 |
| 2012/0076369 | A1 | 3/2012 | Abramovich et al. | |
| 2013/0100008 | A1* | 4/2013 | Marti | G06F 3/013 345/156 |
| 2015/0130917 | A1 | 5/2015 | Mil'shtein et al. | |
| 2015/0208059 | A1 | 7/2015 | Hassebrook et al. | |
| 2016/0180142 | A1* | 6/2016 | Riddle | G06V 40/1312 382/124 |
| 2018/0046840 | A1 | 2/2018 | Howell | |
| 2018/0268193 | A1* | 9/2018 | Badzinski | H04N 7/188 |
| 2018/0330142 | A1 | 11/2018 | Trouboul | |
| 2019/0026527 | A1 | 1/2019 | He et al. | |
| 2019/0180133 | A1* | 6/2019 | Shannon | G06V 40/1347 |
| 2020/0202101 | A1 | 6/2020 | Howell et al. | |
| 2020/0320321 | A1 | 10/2020 | Yang et al. | |
| 2022/0351536 | A1 | 11/2022 | Dumont | |

* cited by examiner

DEVICE AND METHOD FOR NON-CONTACT OPTICAL IMAGING OF A SELECTED SURFACE AREA OF A HAND

PRIORITY CLAIM

This application is a continuation of U.S. patent application Ser. No. 17/535,149, filed Nov. 24, 2021, which claims priority to German Patent Application No. 10 2020 131 513.9, filed Nov. 27, 2020, the disclosures of which are hereby incorporated by reference herein in their entirety.

FIELD OF THE INVENTION

The invention relates to devices and methods for non-contact imaging of a selected surface area of a hand.

BACKGROUND OF THE INVENTION

The outbreak of the Corona virus (SARS-CoV-2) in late 2019/early 2020 triggered a global crisis. The virus is extremely contagious and transmissible via droplet and smear infections. Hubs for virus transmission include international airports. For some time now, an increasing number of fingerprint scanners have been used there to identify passengers. The first generation of fingerprint scanners were contact-based devices where a hand, individual fingers, all fingers, one or both thumbs (biometric object) were placed on a transparent user surface. To avoid smear infections when using such devices in a virologically unsafe time, the user surface must be cleaned after use by each user, requiring the permanent involvement of another user. In the case of devices that have an automated interactive user guidance system, no other person needs to be present for the proper use of the device, so that an additional worker is required here due to the need for regular cleaning of the user surface.

In a new, contactless generation of optical fingerprint scanners, based on structured illumination, the biometric object is no longer placed on top, but is positioned in a virtual object area of the device's optical system.

The term fingerprint scanner has become a generic term for the devices in which biometric objects, in the sense of skin structures of fingers, hereinafter referred to as surface areas, are optically captured. It does not matter whether the device in question is designed for all the above-mentioned biometric objects or for only one or part thereof. Nor does it matter how the captured image of the biometric object is generated, e.g. by scanning the object or imaging it as a whole. The term print has historical roots. Here, it stands for any type of image of the biometric object, regardless of whether the object is pressed onto a control surface during the capturing process or is arranged contactlessly in a virtual object area (often also called scanning area).

The main challenge with non-contact fingerprint scanners is to correctly position the hand in the virtual object area so that a high-resolution image can be generated. This should involve interactively guiding the user in an automated manner.

US 2018/0330142 A1 describes a device for capturing fingerprints, with a capturing zone through which a user's hand is moved. The device has a transparent cover surface and a projection surface arranged parallel thereto at a distance of a few centimeters, the capturing zone being located between said surfaces. The capturing zone is open frontally and laterally with respect to the position intended for the user, so that the user can comfortably move his hand horizontally through the capturing zone in front of the user's body. The object field of a static line scan camera is located within the capturing zone. The camera sensor has an image capture speed that is sufficiently large to be able to capture a clear image of the fingers from the individual images captured of "lines" of the hand at a common hand movement speed.

US 2015/0208059 A1 describes a device and a method for determining 3D coordinates, e.g. of a finger, from a plurality of images, from which a 2D representation comparable to a fingerprint generated by rolling off a finger covered with ink is generated. For this purpose, the device has a projector with structured illumination that is used to project one or more light patterns onto the three-dimensional surface of the finger, deforming the light pattern(s) in a manner characteristic of the biometric structure of the finger surface. One or more images are taken of the deformed light pattern(s) using one or more cameras. In this case, the finger surface is positioned at a predetermined distance from the projector and the camera(s) in a virtual plane.

For positioning the hand, the device has a slot in which the right or left hand is inserted. The slot encloses a scan volume in which the hand is positioned in front of a background acting as a reference plane. Positioning pins are provided at this reference plane to assist in the correct positioning of the hand within the scan volume so that the finger surface is positioned at the specified distance from the projector and camera(s) in an object plane. The arrangement of the positioning pins determines the actual position of the hand in this case.

The aforementioned US 2015/0208059 A1 also discloses user guidance to guide the user in positioning their hand. After inserting the hand into the slot, low-resolution trial images are generated, and the user can see the position of his hand in relation to the positioning pins in the trial images, guiding the user to the correct position of the hand. Additionally or alternatively, user guidance can be provided by automated voice information or by a person's instructions.

A particular disadvantage of the device disclosed therein is that the positioning of the hand takes place by bringing it into contact with the positioning pins. A method wherein the finger surface is held in a virtual plane and optically captured without contact can be used advantageously, especially where and when skin contact is undesirable. By positioning the hand on positioning pins, the advantage for the user resulting from contact-free capturing of the finger surface, namely that the user does not come into contact with anything and thus has no skin contact with any surfaces, is nullified.

US 2020/0202101 A1 discloses another capture device for non-contact capture of biometric data, such as fingerprints and palm prints.

The capture device includes an electronics compartment, which houses all hardware components including a light source and a camera, and a housing guide enclosing an image capture region. An object, e.g., a hand, positioned exactly in the image capture region can be captured with the highest quality by the camera. Various embodiments are specified for the housing guide, which make exact positioning possible without the object to be positioned coming into contact with the housing guide. Basically, a collar is formed on the housing guide that encloses the image capture region except for an entry gap. The collar provides a visual indicator for rough positioning. This means that the user who guides his hand into the image capture region will thus already move the hand from the correct direction and into a narrow room volume around the image capture region. Advantageously, the housing guide is intended to include a placement indicator. The placement indicator may have a sensor for detecting the position of the object and an output for signaling the correct position of the object to be imaged. The disclosure, according to which the localization of the hand can be carried out with at least one IR sensor, allows the conclusion that the correct position can only be meant here with reference to an axial direction. The output may be, for example, a flashing colored light whose color or flashing frequency can change. The output may also be the display of a suitable icon that provides visual instruction to the user for each step of the image capture process. For example, the icon can first show a right hand, then a left hand, and then the user's thumbs. The output may also be a change in an audio signal. The placement indicator may also be a graphic display device that displays images and/or moving images. The images may be texts, symbols or other graphic elements. The placement indicator may be connected to one or more infrared sensors present in the electronics compartment. The IR radiation reflected back from the object is used to determine whether an object has entered the image capture region, which is done via a vertical movement within the collar. If the signal formed by the reflected radiation exceeds a predetermined threshold, the hand has arrived in the image capture region and the controller in the electronics compartment triggers the light source and the camera. During image capture, the infrared sensor is disabled to avoid extraneous light influences affecting image capture.

A disadvantage of a detection device according to the aforementioned US 2020/0202101 A1 is that active guidance is only provided in the axial direction of the imaging system. The radial alignment of the hand is determined exclusively by the entry gap of the collar. As the radial position of the hand is determined exclusively by the entry gap of the collar, the entry gap must be no more than slightly wider than the width of a broad hand. As a result, there is an increased risk that, during insertion in the collar, the hand will come into contact with the collar and that radial positioning will vary in accuracy for hands of different sizes.

SUMMARY OF THE INVENTION

It is an object of the invention to provide a device which is suitable for localizing a user's hand held in an actual position in a frame and for actively guiding the user until his hand arrives not only axially but also radially in a target position.

It is also an object of the invention to find a suitable method to do so.

Advantageously, not only should at least one image of a surface area of the hand be captured in the target position, but it should also be detected whether the hand is a natural hand.

The object is achieved by a device for optical imaging of a selected surface area of a user's hand, said device comprising a housing in which an image capture unit containing a main camera with an optical axis and an illumination unit is accommodated, a control and computing unit, an output unit, a frame arranged outside the housing and connected to the housing via a stand, said frame having edges delimiting a recess which is open on one side, is open frontally with respect to a user position of the user and in which the surface area is positioned by the user, assuming an actual position, said frame having arranged therein an object plane of the main camera with a depth of field region in which a target position for the surface area is located.

It is essential to the invention that a first active means for localizing the actual position in the axial direction of the optical axis and a second active means for localizing the actual position in the radial direction of the optical axis are provided, or that a universal active means for localizing the actual position in the axial and in the radial direction of the optical axis is provided. With active localization also taking place in the radial direction, active guidance to the target position can also take place in the radial direction. The frame is thus only used for rough positioning, which is why the recess can be made significantly larger than the object field of the main camera, which reliably avoids touching the frame and the object field does not have to be made larger than a broad hand, which promotes fast image processing.

Advantageously, the universal active means includes an auxiliary camera having a larger object field and a lower resolution compared to the main camera, wherein the object field of the auxiliary camera and the object field of the main camera are located in the object plane of the main camera.

Alternatively, it is advantageous if the second active means comprises at least one first distance sensor radiating parallel to the object plane, or the universal active means comprises at least one first distance sensor and at least one second distance sensor radiating at an angle not equal to 0° to the at least one first distance sensor.

It is also advantageous if the second active means includes two first light barriers which form a first light beam pair and, radiating in or parallel to the object plane, enclosing a non-zero angle with each other, are arranged with mirror symmetry to a line extending parallel to an insertion direction of the hand and passing through the optical axis.

Advantageously, the output unit is a display.

Also, the second active means or the universal active means may advantageously be a projector which is arranged on a side of the object plane facing away from the main camera and projects a pattern into the recess.

The output unit may advantageously contain an ultrasonic generator suitable for generating haptically perceptible pressure points on a virtual plane corresponding to the actual position in the axial direction, or contain a compressed air generator with a planar arrangement of nozzles directed into the recess.

The object is achieved by a method for optical imaging of a selected surface area of a user's hand, wherein the selected surface area is positioned in a predetermined target position, within a depth of field region around an object plane of a main camera with an optical axis, wherein the user inserts the surface area to be captured into a frame enclosing the depth of field region, wherein the surface area assumes an actual position, the actual position is localized in the axial direction with respect to the optical axis, and the user changes the actual position by means of an output unit, iteratively guided, and moves the surface area in the axial direction to the predetermined target position, in which at least one image is generated of the surface area by the main camera.

It is essential to the invention that the actual position is also localized in the radial direction with respect to the optical axis and that the user, guided iteratively, also moves the surface area to the predetermined target position in the radial direction.

Advantageously, the actual position is repeatedly localized in axial and radial direction by evaluating a plurality of images of an auxiliary camera taken in a time sequence, wherein the images of the auxiliary camera are created with a resolution lower than that of the at least one image taken by the main camera. Advantageously, the images taken with a lower resolution one after the other are compared with each other and it is analyzed whether the movement toward the target position is accompanied by tremors or the pulsation of blood vessels in order to distinguish a real hand from an artificial one.

It is advantageous if instructions are given via the output unit to change the hand posture, in order to conclude, if necessary, from the sequence of the change in hand posture that the hand is natural.

Alternatively, the images from the auxiliary camera are advantageously analyzed for discontinuity points or gradients that are atypical for a natural hand, in order to infer an artificial hand if necessary.

It is also advantageous to irradiate the surface area with light of at least one wavelength or to direct a measuring beam of the at least one wavelength onto the surface area. When doing so, the light is absorbed by blood vessels in the hand. In the case of light of only one wavelength, a spatial structuring is produced in the image corresponding to the blood vessel structure, and in the case of light of more than one wavelength, the reflected wavelength spectrum or the amount of light reflected at the surface area is analyzed in order to infer a natural hand, if necessary.

To infer an artificial hand if necessary, it is also advantageous to analyze the at least one image from the main camera for atypical spacing of ridges and valleys in a papillary structure of the surface area.

For iterative guidance, a two-dimensional pattern can advantageously be projected into the recess, and the user moves the hand within the frame until the pattern is fully and sharply imaged on the back of the hand.

It is advantageous if the image of the pattern is changed in its color or resolution depending on the proximity to the target position.

The iterative guidance can advantageously also be assisted by haptically perceptible pressure points on the surface area which are generated by ultrasound or air pressure. Additionally or alternatively, the haptically perceptible pressure points generated by ultrasound or compressed air can animate the user to make movements that can only be made by a natural hand, so as to recognize the latter as a natural hand.

BRIEF DESCRIPTION OF THE DRAWINGS

The invention will be explained in more detail below with reference to drawings, wherein.

DETAILED DESCRIPTION

A device according to the invention is used to optically image a selected surface area, more precisely the papillary structure of a selected surface area of four fingers of a user's hand. However, the surface area can also be defined only by individual fingers or a single thumb or both thumbs. For persons with more than four fingers on one hand (excluding thumbs) or more than one thumb on one hand, which occurs in rare cases, the surface area can also be defined by correspondingly more fingers or thumbs per hand.

Figure 1:
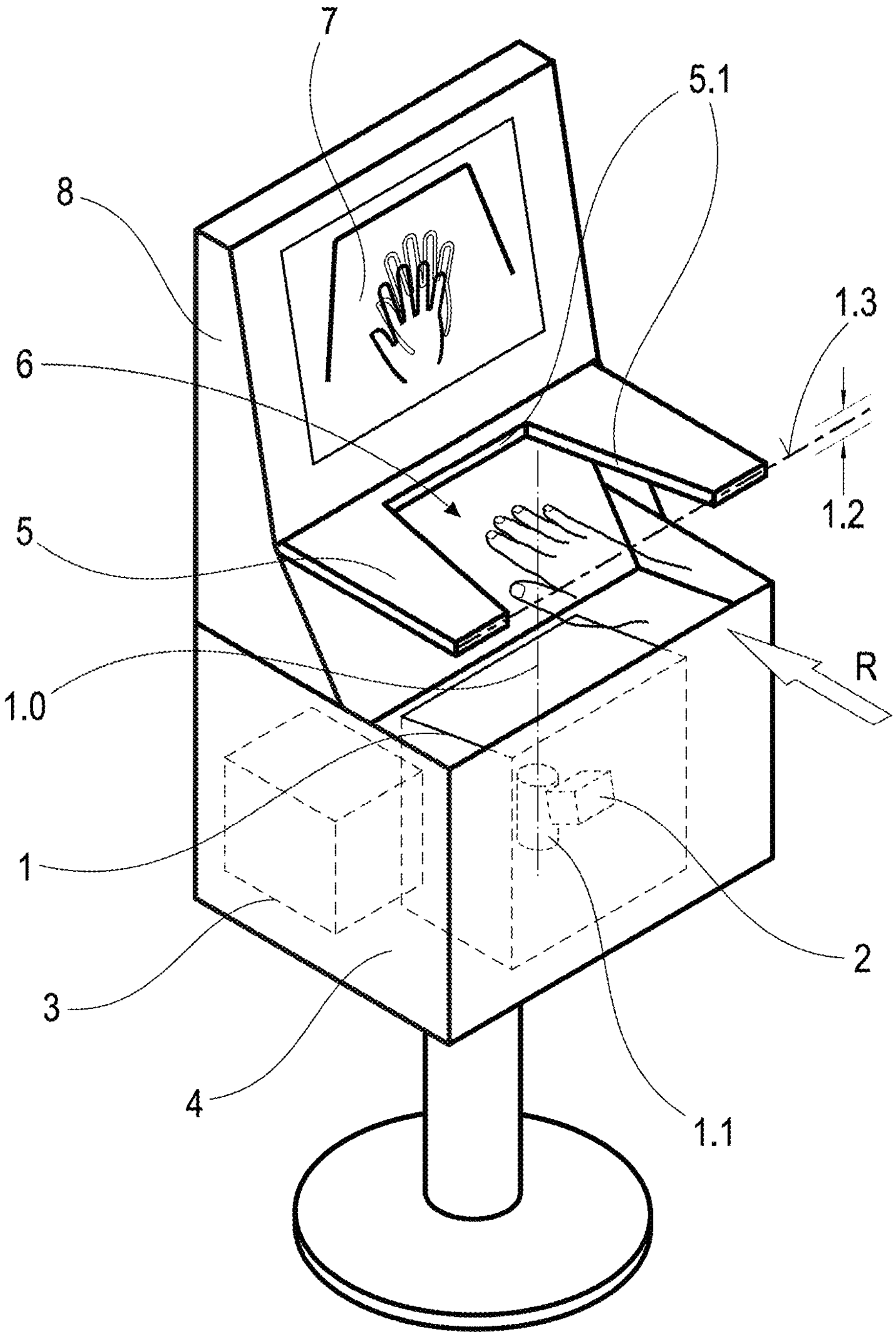
FIG. 1 shows a device in a view generally applicable to the various embodiment examples.

The device is shown in a schematic diagram in FIG. 1 and basically comprises an image capture unit 1, including a main camera 1.1 with an optical axis 1.0 and an illumination unit 2, which is capable of displaying spatially structured images in one or more colors, a computing and control unit 3, a housing 4, an output unit 7, a frame 5, and a first and second active means or a universal active means (not shown here), wherein the first active means is a device, combination of devices, or a system, configured to determine the location of the actual position in the axial direction, the second active means is a device, combination of devices, or a system, configured to determine the location of the actual position in the radial direction, and the universal active means is a device, combination of devices, or a system, configured to determine the location of the actual position in the axial and radial direction to the optical axis 1.0.

The frame 5 is arranged such, with respect to the image capture unit 1, that an object plane 1.3 of the main camera 1.1 and correspondingly a depth of field region 1.2 around the object plane 1.3 are located within a recess 6 of the frame 5. The depth of field region 1.2 and the object field $OF_1$ of the main camera 1.1, see FIG. 2B, which is smaller than the recess 6, limit the image capture region. A surface area located in the image capture region is considered to be a surface area located in a target position and is imaged in focus. The center of the image capture region is located at the intersection of the optical axis 1.0 and the object plane 1.3. The frame 5 is horizontally aligned at a distance above the housing 4 in a preferred operating position of the device and is arranged with the housing 4 in a fixed relative position to each other.

The output unit 7 is arranged on the housing 4, but can also be detached from it and arranged freely in space. In particular, when the output unit 7 is visual in nature, it is advantageously placed above the frame 5 at the user's eye level with respect to the device being in an operating position. In the device according to the invention, the focus is on the user's well-being and intuitive operation by the user. Any contact with the device is to be avoided.

The frame 5 is rigidly connected to the housing 4 via a stand 8 and has edges 5.1 which delimit the recess 6 open on one side, which is open frontally with respect to a user position of a user. The edges 5.1 are advantageously colored in order to be perceived intuitively by the user, but can also be equipped with a controllable colored illumination in order to indicate correct or incorrect positioning of the hand in the recess 6 by color or to draw the user's attention to them or the object plane 1.3. The frame 5 with the recess 6 is a means for rough positioning of the surface area in axial and radial direction to the optical axis 1.0. By means of controllable illumination, the frame 5 can also serve simultaneously as the output unit 7, for providing feedback to the user, or may be sued in addition to the output unit 7 to provide information to the user. By inserting all four fingers of one hand, or just individual fingers or his thumbs into the frame in an insertion direction R, the user positions the surface area in an actual position, which is usually not the same as the target position, but roughly close to it.

In addition to making the recess 6 much wider than a broad hand, in order to avoid any contact with the device, sufficient space is provided between the housing 4, where the image capture unit 1 is located, and the frame 5, where the surface area is placed.

It is essential to the invention that the device, in addition to the frame 5 for coarse positioning for intuitive guidance of the surface area into the target position, also has, in addition to the first active means for determining the location of the actual position in the axial direction of the optical axis 1.0, a second active means for localizing the actual position in the radial direction of the optical axis 1.0, or instead, has a universal active means suitable for determining the location of the actual position in the axial direction and in the radial direction of the optical axis 1.0.

It is essential to a method according to the invention that the random spatial position of a surface area of a user's hand in a frame 5 is detected as an actual position in the axial and radial directions with respect to an optical axis 1.0 of a main camera 1.1 of an image capture unit 1, and the user is iteratively guided, changing the actual position, until the surface area has arrived at a target position corresponding to a predetermined spatial position of the surface area. For this purpose, the user inserts the surface area to be captured into a frame 5 that is preferably horizontally aligned and open toward the user and encloses the depth of field region 1.2. The surface area assumes an actual position there and is iteratively guided by the user in the axial and radial directions to the target position, where at least one image of the surface area is generated by the main camera 1. In the radial direction, in particular, the actual position can deviate quite considerably from the target position, since the recess 6 is designed to be much larger than the width of a broad hand in order to reliably prevent contact. In order to iteratively guide the surface area from the actual position to the target position, the respective actual position of the surface area is localized at the same time, and the results of the localization are used to control the output unit 7.

Figure 2A:
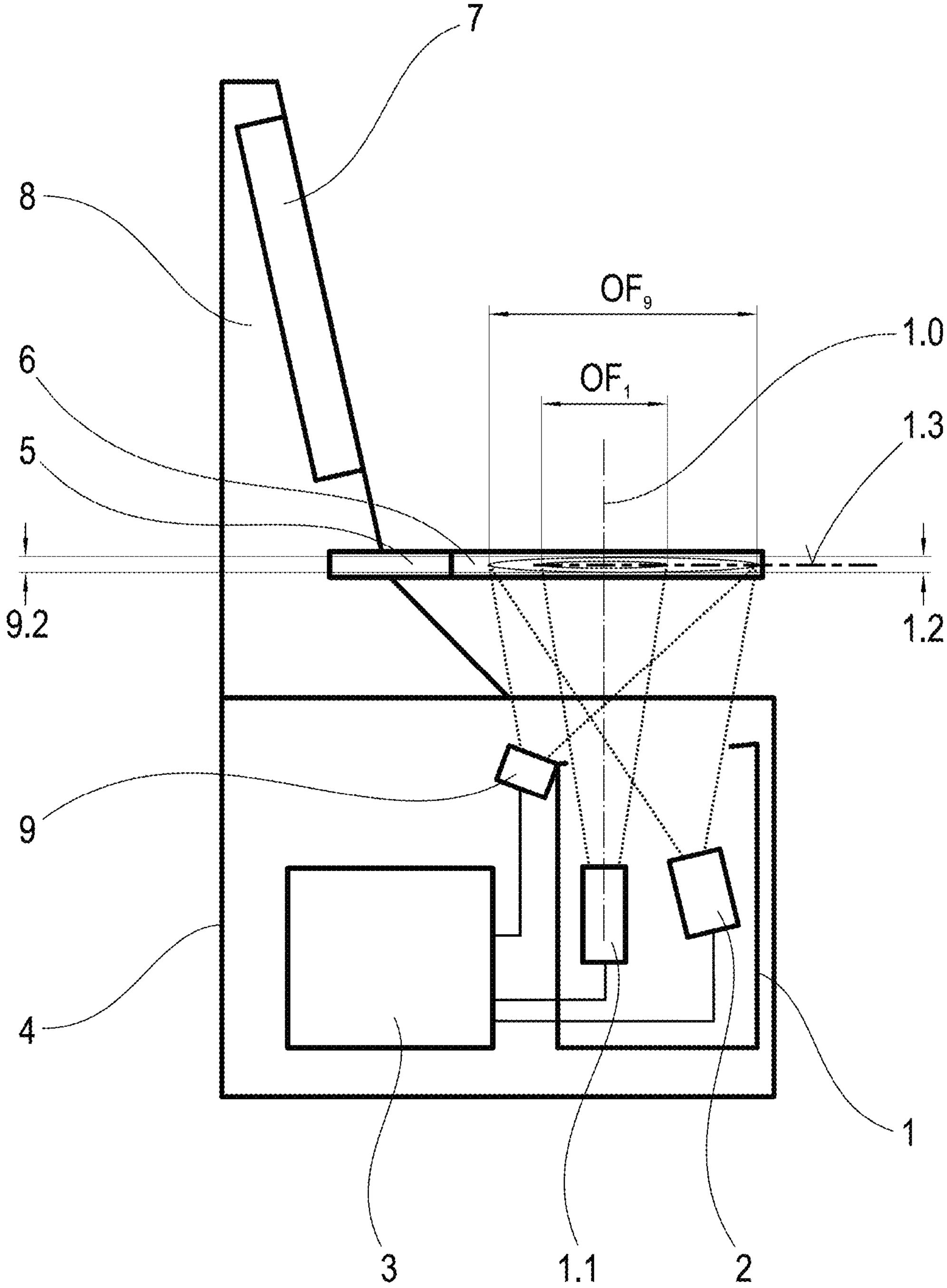
FIGS. 2A-B show a device with a universal active means, including an auxiliary camera, for localizing the actual position in axial and in radial direction.
Figure 2B:
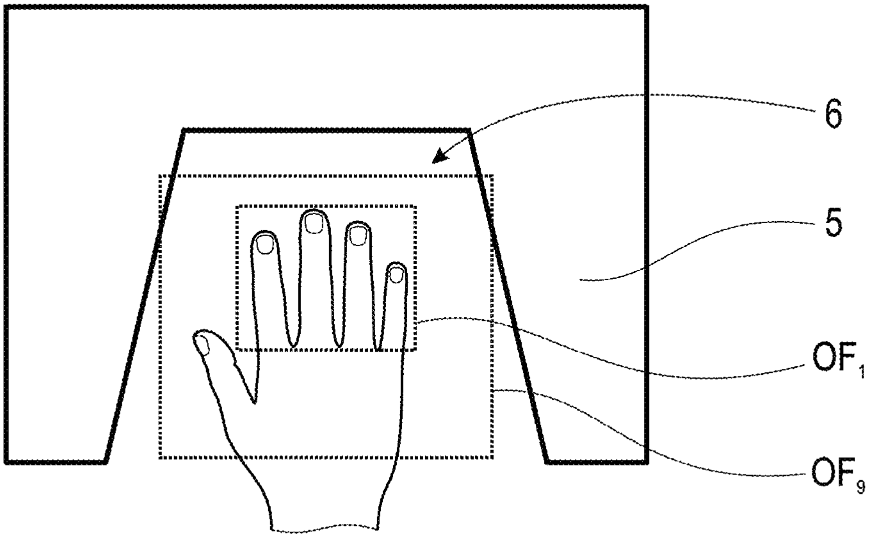

According to a first embodiment example of a device according to the invention, shown in FIGS. 2A and 2B, the universal active means includes an auxiliary camera 9 arranged in a known relative position to the main camera 1.1. It images a larger object field $OF_9$ in the object plane 1.3 with a lower resolution than the main camera 1.1 images an object field $OF_1$ with a higher resolution. The auxiliary camera 9, like the main camera 1.1, generates images in an optical 3D process, whereby the spatial position of the surface area in the radial and axial directions relative to the target position can be derived from the images. In this case, the object field $OF_9$ of the auxiliary camera 9 preferably has a size of at least 90% of the size of the recess 6 of the frame 5, so that even a broad hand is imaged by the auxiliary camera 9 in every possible actual position. The resolution of the auxiliary camera 9 is advantageously only high enough here to allow the localization of the surface area to be inferred from the image. If the auxiliary camera 9 is to perform other functions in addition to localization, it may be advantageous for it to have a higher resolution which is, however, lower than that of the main camera 1.1 in any case. Thus, the image processing of images with the auxiliary camera 9 is faster than that of the main camera 1.1 in any case. Advantageously, a depth of field region 9.2 of the auxiliary camera 9 is also larger than the depth of field region 1.2 of the main camera 1.1.

Depending on the spatial position, which represents an actual position in a time-dependent manner in each case during active guidance, the user is guided iteratively via the output unit 7.

In the process, the localization in the axial and radial direction of the optical axis 1.0 is carried out with an auxiliary camera 9 by successively creating optical images of the surface area, from each of which an actual position can be derived which the surface area occupies within the edges 5.1 of the frame 5 in the axial and radial direction at the time the optical image is created. The respective actual position is compared with the target position and the user is guided iteratively, according to the result of the comparison, until the selected surface area has reached the target position and images are captured with the main camera 1.1. Images can also be captured when only parts of the surface area are in the target position. A plurality of images is then created in which different parts of the surface area are in the target position. From the plurality of images, a total image is then created that represents a sharp image of the entire surface area.

Using the auxiliary camera 9 has the advantage, in comparison with all the second or first modified means specified below, that it can be used to very precisely detect the actual position of the surface area, which is determined by the hand position in the recess 6 and the hand posture (hand curvature). The detection of the hand posture has the advantage of optimized user guidance with detailed instructions for improved imaging of the surface area with the main camera 1.1. For example, if the hand is inclined too much, i.e. held at an angle of 90° or even 180° (back of the hand facing toward the main camera) to the target position in the frame 5, adapted user guidance can be provided, informing the user that he must rotate his hand accordingly for a successful image. The same applies to inclined hand positioning within the plane of the recess. It also applies to the presentation of curved fingers, which makes optimal imaging of the entire surface area difficult and is detected by the auxiliary camera 9. Advantageously, the auxiliary camera 9 also makes it possible to distinguish between an artificial hand, or a natural hand provided with a covering, and a natural hand.

Thus, in a first process embodiment, detection may be performed via proximity analysis. This means that the successively recorded images are analyzed comparatively with each other to determine whether the movement guided to the target position is accompanied by a trembling movement that is characteristic of a real natural hand.

In addition or in a second process embodiment, the user receives instructions via the output unit 7 to change the hand posture by certain movements, for example to bend the fingers or to move individual fingers, which an artificial hand cannot do at least in a natural way, thus identifying it as a fake.

For instruction, an image of the user's hand executing the instructed movement can be displayed on the output unit 7, e.g., in the form of a display. In addition, feedback can be given to the user via symbols. Alternatively, for example, a virtual hand may be shown on the display in a real environment, with the virtual hand providing the movement for the real hand and assuming a predetermined position and hand posture.

By requesting gestures such as "curl hand", "extended index finger" or "hand straight", an artificial hand such as a rubber hand can be detected as it is unable to comply with the request.

An artificial hand, such as a full-volume rubber hand, is also unable to follow the request for a specific sequence of movements during image capture, such as first inserting the right hand, then the left hand and finally the two thumbs into the frame, since it cannot move individual finger segments independently of one another.

In a third process embodiment, discontinuity points or gradients which are atypical for natural hands, in particular sharp demarcations or edges, which typically occur with coverings or 2D counterfeits placed on the finger, are detected, if necessary, in the images from the auxiliary camera 9 or the main camera 1.1.

For further process embodiments, it is proposed to provide illumination with light of at least one wavelength, which is absorbed by the blood in the blood vessels, so that the latter are recognizable in the image of a real hand. For light of more than one wavelength, the spectrum of the reflected light component can be analyzed. Firstly, it can be assumed that an artificial hand does not have the same spectral properties as a natural hand, and secondly, that an artificial hand also lacks vascular structures.

Alternatively or additionally, the presence of a pulse can be detected via regular microstructure changes over the timeline of the images.

To detect thin coverings for the entire hand, usually made of rubber, the images taken by the main camera 1.1 are analyzed for the typical distances of the ridges or valleys of the imaged papillary structure. A covering that is provided with an artificial papillary structure is stretched differently at different points on the hand when it is put on a natural hand, resulting in locally different distances.

According to a second embodiment example of a device according to the invention, not shown in the drawings, the second active means includes at least one first distance sensor 10. The at least one first distance sensor 10.1 is arranged in the frame 5 and aligned in such a way that a measuring beam emanating from it is directed into the recess 6 parallel to the object plane 1.3.

Figure 3:
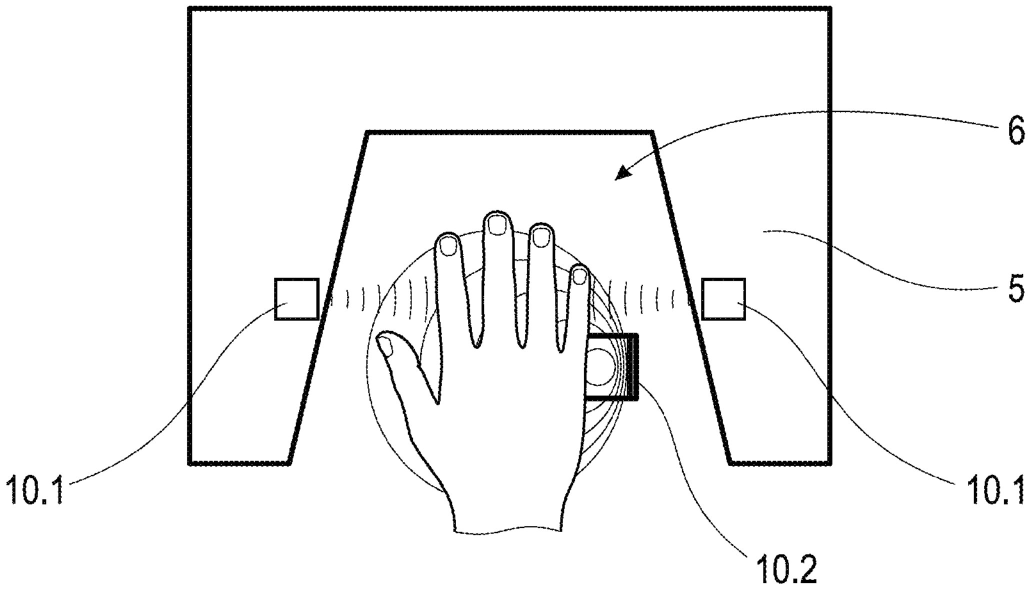
FIG. 3 shows a device with a second active means, containing two distance sensors, for localizing the actual position in radial direction.

Alternatively, as shown in FIG. 3, the universal active means includes, in addition to the at least one first distance sensor 10.1, at least one second distance sensor 10.2 directed toward the object plane 1.3 from the side of the main camera 1.1, preferably arranged in the housing 4. Additional first and/or, in particular, second distance sensors 10.1,10.2 may be present. Thus, a more precise localization in radial direction is possible, e.g. with two second distance sensors 10.2 radiating in opposite directions, as shown in FIG. 3. If the measured distances to the hand are the same, it can be concluded that the hand is positioned centrally in the recess 6 in the radial direction.

The inclination or curvature of the hand (hand posture) can also be detected via several second distance sensors 10.2.

In the process, differences are formed in knowledge of the spatial arrangement of the respective first and second distance sensors 10.1, 10.2 and the measured distance values, and instructions are issued via the output unit 7 which, if complied with, lead to the reduction of the differences.

The instructions can be advantageously acoustic in nature, for example, by changing the frequency of a tone. Thus, a user will intuitively understand the increase in frequency as approaching a target, such as the target position, and the transition to a continuous tone as achieving the target. Advantageously, a color detector is integrated in at least one of the distance sensors 10.1, 10.2, using which the measuring beam reflected back from the skin or from the fake hand is analyzed in terms of color in order to determine whether its spectrum can actually be attributed to the reflection of the measuring beam on a natural hand.

According to a third embodiment example of a device according to the invention, not shown in the drawings, the second active means includes two first light barriers 11.1 forming a first light beam pair 11. The light barriers 11.1 are arranged in the frame 5, advantageously radiating in the object plane 1.3 and with mirror symmetry to a line that is parallel to the insertion direction of the hand and passes through the optical axis 1.0, said arrangement being such that the light beams emitted by the light barriers 11.1 converge.

Figure 4A:
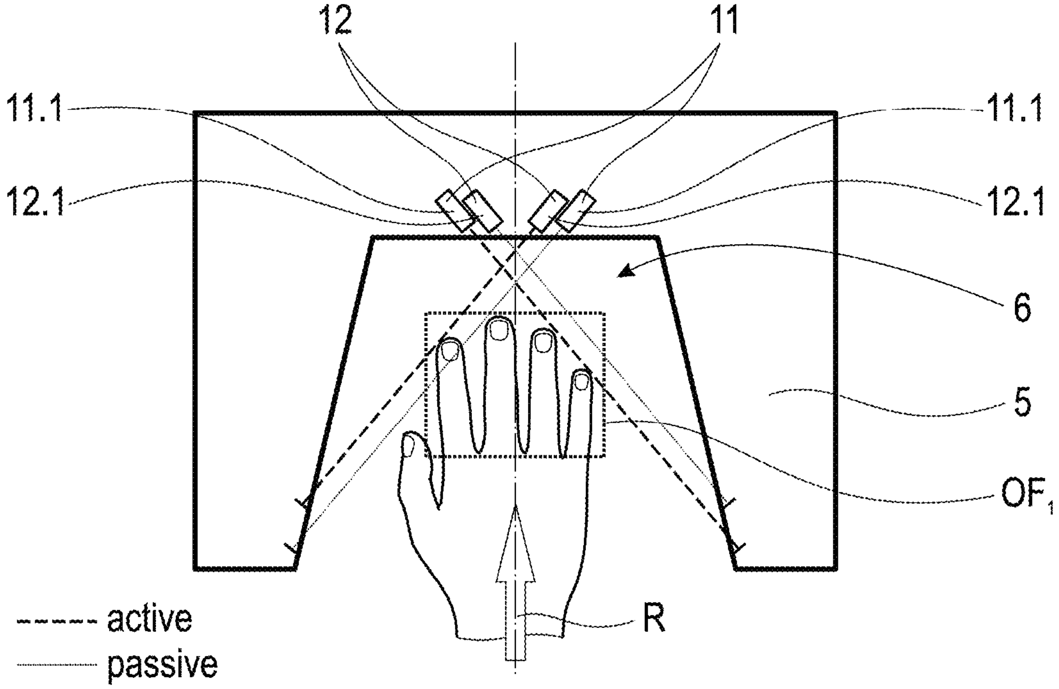
FIGS. 4A-B show a device with a second active means, containing two pairs of light barriers, for localizing the actual position in the radial direction.
Figure 4B:
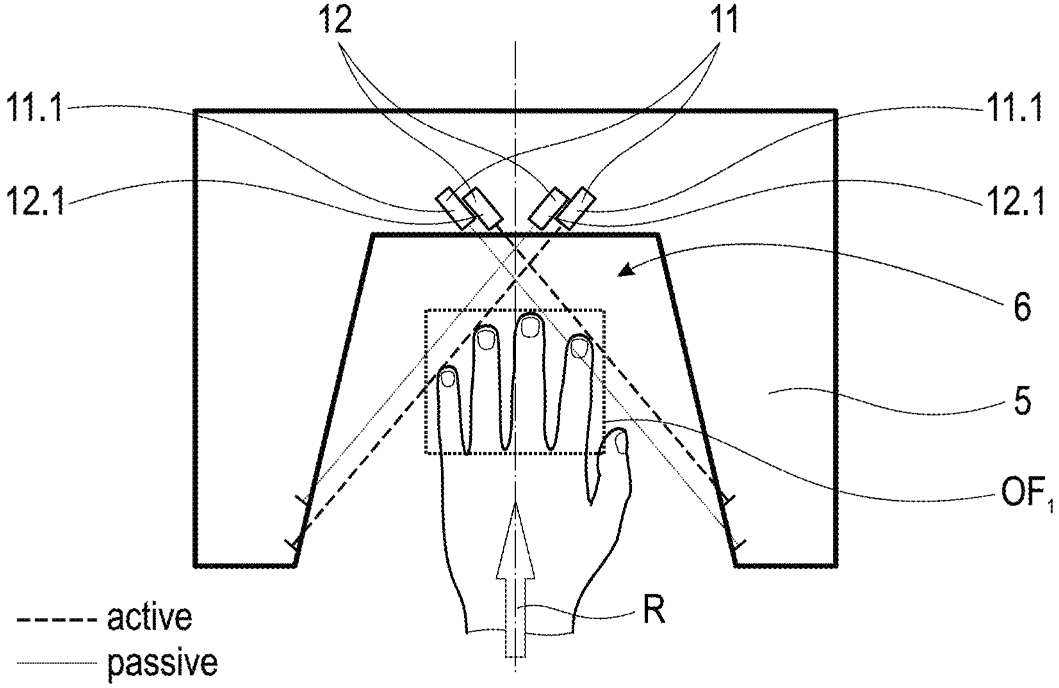

If a hand is inserted centrally in the recess 6 in the insertion direction, both first light barriers 11.1 are interrupted at almost the same moment. A temporal difference results from the different lengths of the little finger and the index finger. Knowing this typical difference, which is not significantly different for the two hands of a user, it is advantageous, as shown in FIGS. 4A and 4B, to provide a second pair of light barriers 12, with second light barriers 12.1 emitting parallel to the first two light barriers 11.1 and arranged with an offset to the first pair of light barriers 11 in the insertion direction. When the left or right hand is inserted, a different pair of light barriers 11, 12 is activated in each case, whereby the light barriers 11.1, 12.1 are interrupted with a shorter time interval between them, provided that the hand was inserted exactly in the center.

In the process, the user repeatedly inserts the hand into the frame 5 in the insertion direction until the light beams are interrupted at the respectively activated light barrier 11.1, 12.1. By moving the hand slightly back and forth, the light beams can be interrupted again and again, and by moving sideways at the same time, the time interval between the interruptions approaches a minimum. Reaching the minimum indicates that the target position has been reached in the radial direction.

In principle, it is advantageous if the output unit 7 is a display, regardless of the embodiment of the first and second active means or the universal active means. Via the display, instructions such as intuitive guidance, concrete feedback in case of error detection and other information can be conveyed to the user in a pleasant way.

For example, a display with very low latency can be used to provide feedback on the correct hand posture and hand position or to give the user instructions on this via symbols. Furthermore, a correct hand posture can be represented by a 3D reference hand on the display to encourage the user to bring his hand, whose image is also preferably displayed in 3D in a different color, into spatial correspondence with the 3D reference hand. If it is difficult for the user to see how well the image of his hand is positioned, the color of the image of his hand or the 3D reference hand can also change continuously, e.g. from orange to green. The remaining deviation from the correct position and hand posture, i.e. the target position, can also be displayed. As an alternative to such 3D user guidance, pictograms can also be used for user guidance.

Figure 5:
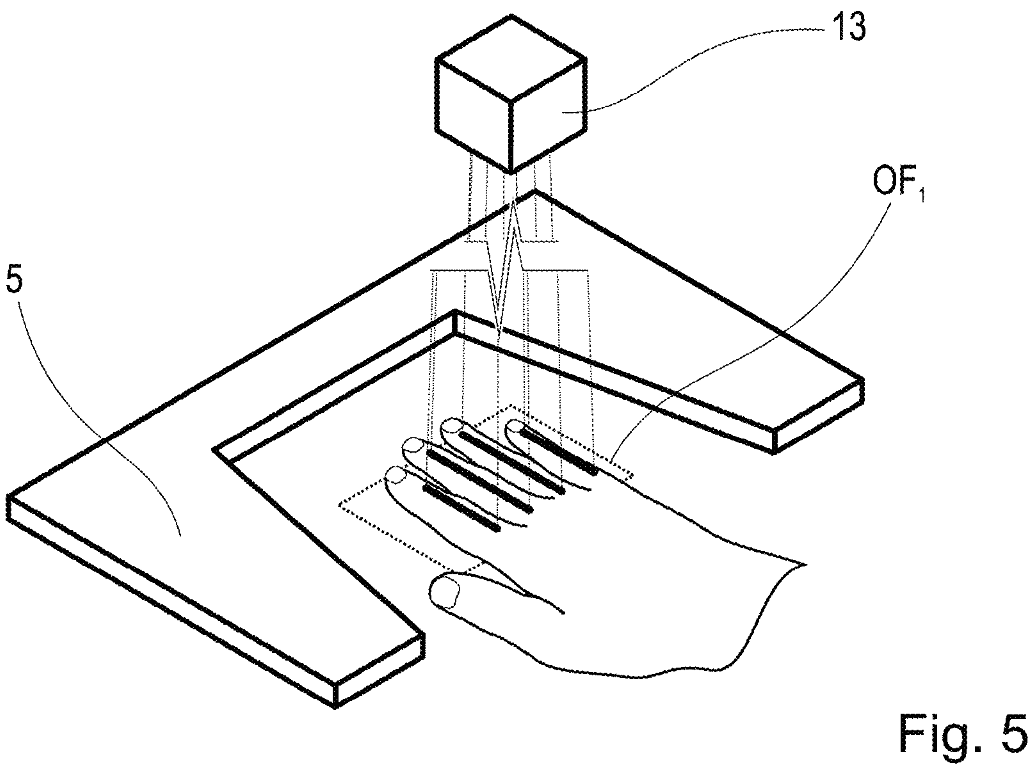
FIG. 5 shows a device with a universal active means comprising a projector for localizing the actual position in axial and in radial direction and FIG. 6 shows a device with an ultrasonic generator for active guidance in the axial direction.

According to a fourth embodiment example of a device according to the invention, the universal active means includes a projector 13, see FIG. 5, which is arranged on a side of the object plane 1.3 facing away from the main camera 1.1 and projects a two-dimensional pattern toward the recess 6. The pattern is projected into the recess 6 such that, when the selected surface area is in the target position, it is completely and sharply imaged on the hand. A sharp image is understood here to mean an image quality that deteriorates in each case when the hand is moved axially with an opposite sense of direction. The pattern can advantageously be formed by strokes that are visible to the user centrally on the fingers when the hand is correctly positioned. Instead of strokes, symbols such as smileys can also be projected onto the fingers, which change color when the fingers are in the target position, for example.

With a simple projection of a two-dimensional pattern, radial and axial guidance can thus be provided, while at the same time showing the user whether the fingers are already in the target position, so that the pattern additionally fulfills the function of the output unit 7 for providing feedback on the respective actual position of the hand.

Figure 6:
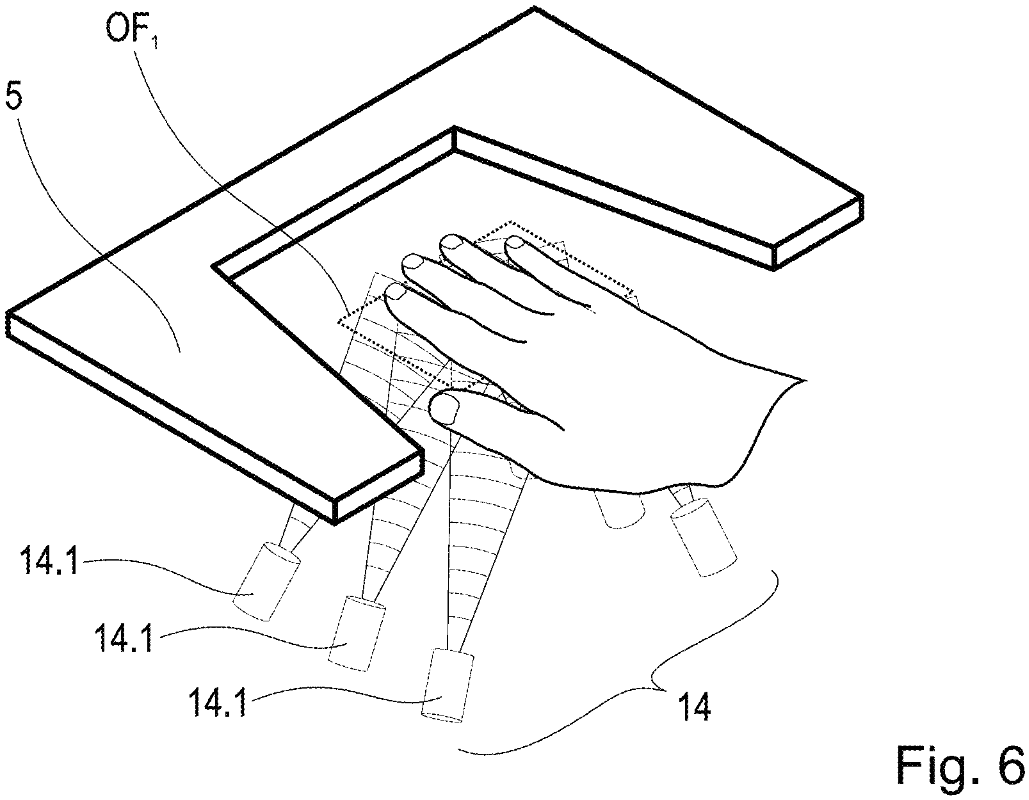

According to a fifth embodiment example of a device according to the invention, as shown in FIG. 6, the device includes an ultrasonic generator 14 that generates a non-contact haptic sensation via perceptible pressure points within the frame 5, suggesting to the user a virtual surface on which to place his hand in order to position it in the target position. The ultrasonic generator 14 is thereby arranged obliquely below the object plane 1.3 to create an effective non-contact haptic feel below the surface area to be recorded. Optionally, further ultrasonic generators 14 can be arranged above the object plane 1.3 and/or integrated in the frame 5. The at least one ultrasonic generator 14 comprises an array of several individually controllable ultrasonic wave generators 14.1 which, where they interfere with each other, generate a noticeable haptic feedback in space. For control purposes, the respective actual position is determined via the first and second active means or the universal active means, which is, for example, the auxiliary camera 9, and is transmitted to the computing and control unit 3, and the at least one ultrasonic generator 14 is controlled accordingly as a function of the detected actual position.

With the integration of a haptically perceptible, virtual surface in space, the target position for the surface area to be recorded can be simulated in axial and radial direction. If the surface area leaves the target position, the pressure applied to the surface area by the at least one ultrasonic generator 14 can be increased to intuitively move the user back to the target position.

The haptic feedback can also be presented to the user selectively. If the user keeps the hand curved during image capture, more pressure can be applied to the downward parts of the hand (e.g. fingertips and ball of the hand), which makes the user intuitively stretch his hand.

Also, by increasing the number of pressure points per area on the surface area, it can be suggested to the user that the hand is approaching the target position.

Optionally, the non-contact haptic means can scan the surface area with a specific, changing frequency. The palpable pressure points then scan the fingertips or the inside of the hand at the changing frequency, with the frequency changing according to the deviation from the target position. For example, the fingertips or palm can feel a pressure point through the ultrasonic array every second. As the hand approaches the target position, the frequency increases, for example the palm is then scanned at 10 pressure points per second. Thus, an approximation feedback to the user is realized.

The haptic feedback can also be matched with feedback on a display as an output unit. A circling clock can visually suggest, for example, via the display and/or symbols projected onto the hand, that image capture of the surface area by the main camera 1.1 is currently in progress. In parallel, a circling non-contact haptic means on the surface area can support this effect and thus make clear to the user the status of the image capture, e.g. image capture not yet started, current image capture in progress, or image capture finished. This visual representation can alternatively be shown directly on the hand by means of the projector 13 instead of on the display.

When using an ultrasonic generator 14, the effect of creating a slight pressure on the surface area can also be used advantageously to increase the imaging quality. By individually adjusting the indentation of the surface area, the 3D shape of the surface area given by the papillary structure is converted to 2D. This means that, especially if the depth of field region 1.2 is only narrow, larger areas of the surface area are in the target position and can be recorded, since, for example, a finger can be pressed flatter. The conversion to a final 2D image can also be done faster this way. In order to select the correct time for image capture, the 3D image capture is synchronized accordingly with the ultrasound pulsing.

Also, the ultrasonic generator 14 can be advantageously used to detect counterfeits. If a counterfeit is suspected, various pressure points and/or pressure areas are generated that would trigger a certain action on a human or natural surface area, since humans feel the pressure point. If a counterfeit lies on the surface area or a counterfeit covering is worn over the hand, the haptic feedback is not perceived. Detection is conceivable via interaction over the display by asking how many pressure points can be felt, or whether a pressure point moves clockwise or counterclockwise, or whether it moves left/right or up/down, to determine whether a counterfeit or natural surface area is presented to the device for image capture of 3D skin prints. As a particularly advantageous intuitive interaction option, it is suggested that the user should move his hand or fingers away from the direction from which the pressure points act. In this case, the perception of the pressure is verified by the user reacting to the signal in a defined time frame after it has been generated.

The at least one ultrasonic generator 14 is arranged below the object plane 1.3. Further ultrasonic generators 14 can be arranged above or also within the frame 5. Advantageously, several ultrasonic generators 14 are arranged in space, distributed around the recess 6, in order to be able to apply pressure to the hand from different sides.

According to a sixth embodiment example of a device according to the invention, not shown in the drawings, a compressed air generator with a plurality of controllable nozzles is provided, comparable to the functions assigned to the ultrasonic generator 14. The hand can be guided or stimulated to make movements via the targeted control of the individual nozzles, which may prove that it is a natural hand.

LIST OF REFERENCE NUMERALS

1 image capture unit
1.0 optical axis
1.1 main camera
1.2 depth of field region
1.3 object plane
2 illumination unit
3 computing and control unit
4 housing
5 frame
5.1 edge
6 recess
7 output unit
8 stand
9 auxiliary camera
9.2 depth of field region of the auxiliary camera
$OF_1$ object field of the main camera
$OF_9$ object field of the auxiliary camera
10.1 first distance sensor
10.2 second distance sensor
11 first pair of light barriers

11.1 first light barrier
12 second pair of light barriers
12.1 second light barrier
13 projector
14 ultrasonic generator
14.1 ultrasonic wave generator
R insertion direction

The invention claimed is:

1. A method for non-contact optical imaging of a selected surface area of a user's hand positioned in a predetermined target position within a depth of field region around an object plane of a main camera with an optical axis, comprising:

inserting the selected surface area to be captured into a frame enclosing the depth of field region, wherein the surface area assumes an actual position;

localizing the actual position in an axial direction with respect to the optical axis;

iteratively guiding a user with an output unit to change the actual position and move the selected surface area in the axial direction toward the predetermined target position;

localizing the actual position in a radial direction with respect to the optical axis;

iteratively guiding a user to move the surface area to a specified actual position in the radial direction;

generating by the main camera at least one image of the selected surface area;

repeatedly localizing the actual position in axial and radial directions by evaluating a plurality of images taken by an auxiliary camera in a time sequence, wherein each of the plurality of images from the auxiliary camera is created with a resolution lower than that of the at least one image taken by the main camera; and either:

comparing with each other, the images of the plurality of images created with the lower resolution one after the other and determining whether movement toward the target position is accompanied by tremors or the pulsation of blood vessels in order to distinguish a real hand from an artificial hand; or analyzing the plurality of images from the auxiliary camera for discontinuity points or gradients that are atypical for a natural hand, in order to infer an artificial hand.

2. The method for non-contact optical imaging of a selected surface area of a user's hand according to claim 1, further comprising giving instructions via the output unit to change a hand posture to conclude from the time sequence of the change in hand posture that the hand is natural.

3. A method for non-contact optical imaging of a selected surface area of a user's hand positioned in a predetermined target position within a depth of field region around an object plane of a main camera with an optical axis, comprising:

inserting the selected surface area to be captured into a frame enclosing the depth of field region, wherein the surface area assumes an actual position;

localizing the actual position in an axial direction with respect to the optical axis;

iteratively guiding a user with an output unit to change the actual position and move the selected surface area in the axial direction toward the predetermined target position;

localizing the actual position in a radial direction with respect to the optical axis;

iteratively guiding a user to move the surface area to a specified actual position in the radial direction;

generating by the main camera at least one image of the selected surface area; and either:

irradiating the surface area with light of at least one wavelength or directing a measuring beam of said at least one wavelength onto the surface area, wherein the light is absorbed by blood vessels in the hand and, in the case of light of only one wavelength, a spatial structuring is produced in the image corresponding to the blood vessel structure, and in the case of light of more than one wavelength, the reflected wavelength spectrum or the amount of light reflected at the surface area is analyzed, in order to infer a natural hand; or analyzing the at least one image from the main camera for atypical spacing of ridges and valleys in a papillary structure of the surface area to infer an artificial hand.

4. A method for non-contact optical imaging of a selected surface area of a user's hand positioned in a predetermined target position within a depth of field region around an object plane of a main camera with an optical axis, comprising:

inserting the selected surface area to be captured into a frame enclosing the depth of field region, wherein the surface area assumes an actual position;

localizing the actual position in an axial direction with respect to the optical axis;

iteratively guiding a user with an output unit to change the actual position and move the selected surface area in the axial direction toward the predetermined target position;

localizing the actual position in a radial direction with respect to the optical axis;

iteratively guiding a user to move the surface area to a specified actual position in the radial direction;

projecting a two-dimensional pattern into a recess, and moving the hand within the frame until the pattern is fully and sharply imaged on a back of the hand; and generating by the main camera at least one image of the selected surface area.

5. The method for non-contact optical imaging of a selected surface area of a user's hand according to claim 4, further comprising changing a color or resolution of the image of the pattern depending on proximity to the target position.

* * * * *